United States Patent [19]

Timmerman

[11] 4,124,177
[45] Nov. 7, 1978

[54] HEATING SYSTEM

[76] Inventor: Robert W. Timmerman, 25 Upton St., Boston, Mass. 02118

[21] Appl. No.: 789,370

[22] Filed: Apr. 21, 1977

[51] Int. Cl.$^2$ ............................................. F25B 13/00
[52] U.S. Cl. ..................................... 237/2 B; 62/117; 62/185
[58] Field of Search ...................... 62/238, 185, 196 C, 62/119, 228, 117; 237/2 B; 165/28

[56] References Cited

U.S. PATENT DOCUMENTS

| | | | |
|---|---|---|---|
| 3,744,264 | 7/1973 | Ware | 62/119 X |
| 4,006,857 | 2/1977 | Adrian | 237/2 B |
| 4,041,724 | 8/1977 | Gustafsson | 237/2 B X |

*Primary Examiner*—William E. Wayner
*Attorney, Agent, or Firm*—Wolf, Greenfield & Sacks

[57] ABSTRACT

A system for utilization of waste heat streams, such as from a power plant, for the heating of buildings or for other uses of heat streams under 200° F. employing preferably a multi-stage heat pump selectively operable to raise the temperature of the building heating system (heated fluid) above the temperature of the waste heat stream (heating fluid). The multi-stage heat pump comprises separate stages each including an evaporator, condenser and compressor, and a heat exchanger. The heat pump may be connected either as a counter flow heat pump or a parallel flow heat pump. The control of the system is in at least two different modes dependent upon the demand (load). In the low load mode heat transfer to the building heating system occurs without operation of the heat pump. In this mode heat transfer occurs with the heat exchanger operating in combination with passive evaporator-condensor action with the compressor of the heat pump being by-passed to maintain the heated fluid outlet temperature at a preset value by controlling mass flow of the heating fluid as a function of sensed heated fluid outlet temperature. Once the load increases past a predetermined point the heat pump is activated and maintains the heating fluid outlet temperature constant. At short peak loads the total mass flow into the heat pump is limited thus relying upon the heat pump to extract more heat from the heating fluid to meet the peak loads. The control of the heating fluid stream is preferably accomplished with a single valve controlled as a function of the three variables; (1.) heated fluid outlet temperatures; (2.) heating fluid outlet temperature; and (3.) mass flow.

11 Claims, 9 Drawing Figures

HEATING SYSTEM

BACKGROUND AND SUMMARY OF THE INVENTION

The present invention relates in general to a heating system which preferably employs a multi-stage heat pump for utilization of waste heat streams for the heating of buildings, the production of domestic hot water, and for other processes requiring heat streams under 200° F. The waste heat stream which is a by-product from a power plant is a stream of usually heated water at temperatures in the vicinity of 100°–120° F. This invention is concerned with controls for the heating system so as to provide an optimum operating system. Although the system is discussed as being used in conjunction with a waste heat stream, it is understood that similar systems can also be designed for use with any heated fluid stream.

It is theoretically possible to use the waste heat stream directly for heating puposes. However, there are factors which make such use undesirable or impractical. Normally, to maintain carrying charges low on the transmission and distribution piping, the piping is made as small as possible. However, to do this one must make the mass flow as small as possible which results in large temperature drops across the utilization apparatus. High temperature drops result in outlet temperatures in the 70°–90° F. range. Temperatures this low thus require oversize heat transfer means (radiators), which makes the system too costly.

Another alternative instead of the use of oversize radiators is to employ a heat pump to raise the temperature of the heated fluid above the temperature of the heating fluid. In this way, the heat pump decouples the building heating system (heated fluid) from the waste heat stream (heating fluid). This use of a heat pump has been suggested by several authors, notably Illeri, et al (transactions of the ASME, Journal of Engineering for Power, July, 1976, p. 309 ff). In addition, the Department of Defense has done some experimentation in this area. See the following report; "Management of Power Plant Waste Heat in Cold Regions", by Haldor W. C. Aamot, U.S. Army Cold Regions Research and Engineering Laboratory, Hanover, N.H., December, 1974. This prior work proposes the use of waste heat at the normal condenser outlet temperature, and employ a heat pump based on more or less conventional water chillers.

In accordance with the present invention a new system has been devised for the utilization of waste heat including the controls to be used to make optimum use of the waste heat. The present invention employs a multi-state concept for the heat pump.

The multi-stage concept has been used in the refrigeration art (see, for example, the 1967 ASHRAE guide, p. 129). However, although series connected water chillers are occasionally used for refrigeration purposes, usually these machines are connected in series on the evaporator side, and in parallel on the condenser side. Furthermore, the refrigeration art does not teach the special control features incorporated into the design of the present invention because of the different operating conditions in refrigeration systems which do not lend themselves to the control in accordance with the present invention.

The heat pump of the present invention may be arranged either as a counter flow heat pump or a parallel flow heat pump. In the counter flow pump, the heating fluid and the heated fluid flow in opposite directions through the evaporators and condensers, respectively, while in the parallel flow pump, both streams flow in the same direction. Each stage in the counter flow arrangement has the same temperature lift, while the lifts are different for each stage in the parallel flow arrangement. Each arrangement has its own particular advantages and disadvantages, which will be discussed hereinafter. It can be shown from a detailed thermodynamic argument, not set forth in detail herein, that the coefficient of performance is independent of which arrangement is chosen.

One important feature of the present invention is the control that is used in association with the heat pump to optimize this system for waste heat applications. In particular, at low loads, the required heat fluid temperature may be less than the entering heating fluid temperature. This condition is not encountered in refrigeration applications employing water cooled water chillers because normal chilled water temperatures are of the order of 42° F. This is sufficiently close to the freezing point that normal cooling towers (which are almost universally used for heat rejection) are frequently heated to preclude freeze-ups, which in turn precludes use of the condenser water for providing cooling without running the refrigeration. Consequently, the apparatus used in the refrigeration field has not been controlled at all in accordance with the control of the present invention.

With a properly designed waste heat utilization system, the heated fluid temperature may be less than the entering heating fluid temperature as much as 25–50% of the time. Therefore, in accordance with the invention an economic advantage is realized by not running the heat pump during these low load periods. Instead, a heat exchanger is used to perform heat transfer at low loads. In addition, further passive evaporator-condenser action occurs with the compressor of the heat pump being by-passed. This is especially advantageous with the counter flow arrangement.

In a normal refrigeration machine, refrigerant will flow from the evaporator to the condenser without the compressor being operated as long as the evaporator saturation temperature is greater than the condenser saturation temperature. Flow rate is limited by the pressure drop in the compressor and in the refrigerant flow control device. To permit maximum heat flow from the evaporator to the condenser, the compressor and refrigerant control devices are both by-passed in accordance with this invention whenever the evaporator temperature exceeds the condenser temperature by a certain amount. When a refrigerant control device is by-passed, the entire charge of refrigerant ends up in the evaporator so that that vessel is designed with a sufficient liquid capacity to hold the entire charge.

In accordance with the control of this invention there are at least two different modes which are dependent upon the demand (load). In the low load mode, heat transfer to the building heat system occurs without operation of the heat pump. In this mode the heat transfer occurs with the heat exchanger operating in combination with passive evaporator-condenser action. Once the load increases past a predetermined point, the heat pump is activated and the heating fluid flow is regulated to maintain a constant heating fluid outlet temperature.

The control scheme of the invention is predicated on a constant mass flow of the heated fluid, and variable mass flow of the heating fluid. At short peak loads the total mass flow into the heat pump is limited thus relying upon the heat pump to extract more heat from the heating fluid to meet these peak load conditions.

BRIEF DESCRIPTION OF THE DRAWINGS

The concepts of the present invention will be better understood upon a reading of the following description taken in conjunction with the accompanying drawings, in which.

DETAILED DESCRIPTION

Figure 1:
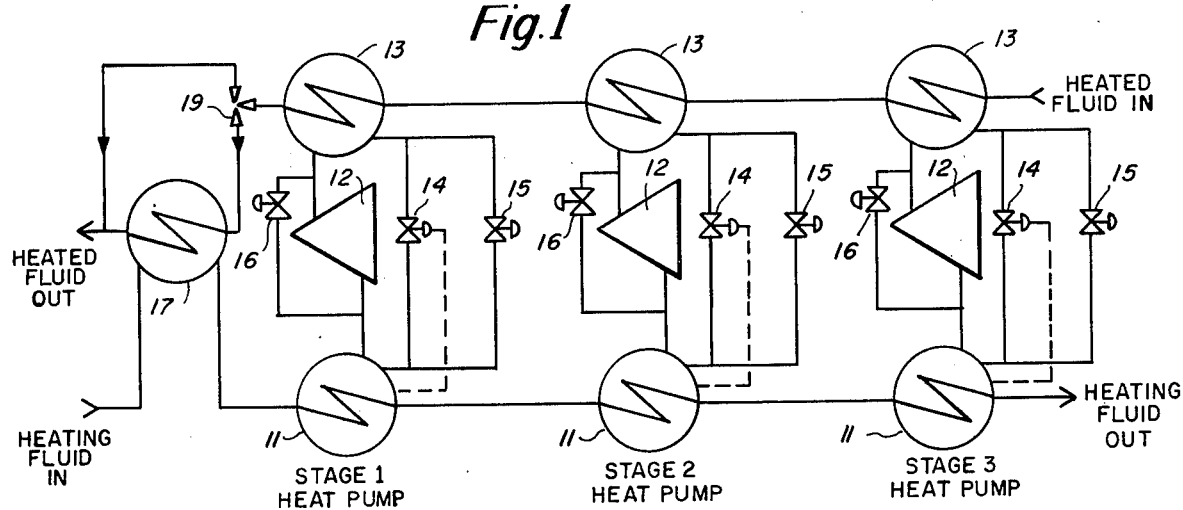
FIG. 1 is a schematic diagram showing a multi-stage counter flow heat pump and controls in accordance with the invention.
Figure 2:
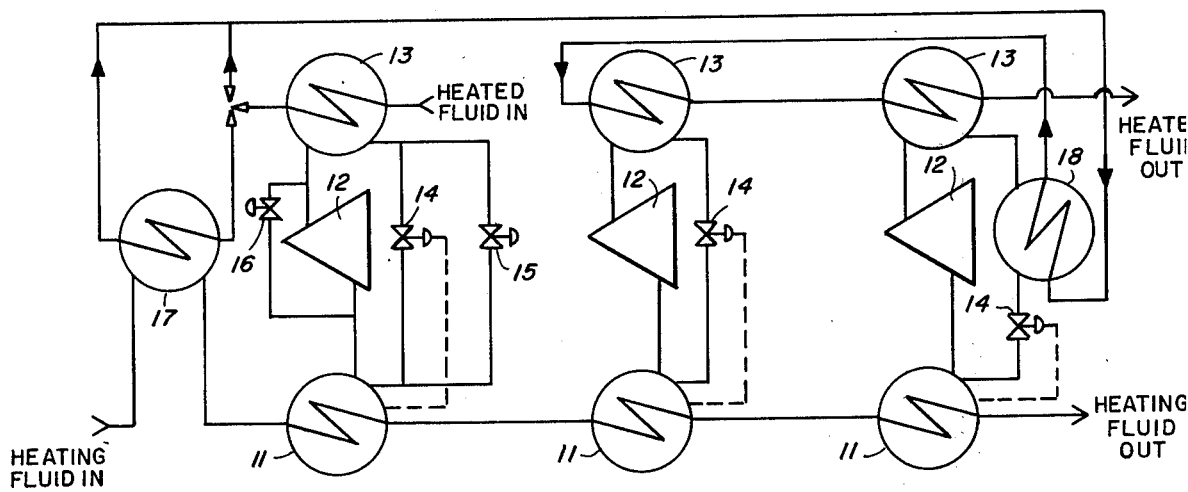
FIG. 2 is a schematic diagram of a multi-stage parallel flow heat pump and controls in accordance with the invention.

FIGS. 1 and 2 show two alternate constructions for the heat pump in accordance with this invention. The operating characteristics of the counter flow heat pump and the parallel flow heat pump are slightly different, and so will have somewhat different applications. The counter flow heat pump arrangement makes good use of the heat pump evaporators and condensers to supplement the heat exchanger associated with each pump, so that a smaller heat exchanger is required than in the parallel flow arrangement. At the same time, since all the temperature lifts are the same with the counter flow arrangement, it is possible to first load the stage with the lowest temperature lift. This functions to degrade performance during heat pump operations. Therefore, the optimum application for the counter flow heat pump is when the percentage of time, that heat can be transferred without using the heat pump, is relatively high.

The parallel flow heat pump has a different temperature lift for each stage. This permits preferentially loading the low temperature lift stages, to minimize power consumption. Also, the high temperature lift on the final stages permits the application of liquid sub-cooling to these stages. However, the parallel flow arrangement results in degraded performance of the evaporator and condenser as simple heat exchangers, which requires more surface in the conventional heat exchanger. All of these factors lead to the application of the parallel flow heat pump to those cases where the heat pump is required to be operated a relatively large percentage of the time.

In designing a system of the present invention, there are two factors which must be taken into account. Firstly, the heat pump output is to be matched to the requirements of the load which is a normal design requirement. Secondly, the flow of heating fluid must be regulated to match the load. In accordance with the control of this invention the load range is divided into three regimes: low, intermediate, and high. A low load is defined as a load requiring outlet water temperature sufficiently below the entering heating fluid temperature so that heat transfer takes place without active operation of the heat pump. In the intermediate and high load ranges the heat pump is operated. The control in accordance with the invention is discussed in more detail hereinafter with reference to FIGS. 3 and 4 as the control operates in conjunction with either of the heat pumps shown in FIGS. 1 and 2.

The action of the control scheme of this invention is predicated on constant mass flow of the heated fluid, and variable mass flow of the heating fluid. This maintains the temperature drop of the heated fluid at low levels at partial loads, which permits the heat pump to operate more efficiently at these partial loads. The heated fluid may transfer heat to the space by either forced convection, natural convection, or the heated fluid can be used directly.

In FIGS. 1 and 2 like reference characters are used to identify like parts of the system. FIG. 1 shows the counter flow heat pump while FIG. 2 shows the parallel flow heat pump. Each pump comprises three separate and like stages, each comprising a refrigerant evaporator 11, a compressor 12, and a refrigerant condenser 13. The normal refrigeration cycle is implemented by the further use of a refrigerant control valve 14 which controls the flow between evaporator and condenser to maintain a constant evaporator level. Each of the compressors has a control input for controlling operation thereof only during the intermediate and high load regimes.

The valves 15 and 16 are operated only during the low load regime and are controlled to open when the temperature in the evaporator exceeds the temperature in the condenser by a preset amount, permitting the free flow of refrigerant between the condenser and the evaporator. This allows the evaporator and condenser to function as a heat exchanger. Only one such by-pass is provided for the parallel flow arrangement, due to the low effectiveness of parallel flow heat transfer. The valves 15 and 16 may be controlled both as a function of the particular operating regime and secondly are operated in response to a preset temperature difference sensed from the condenser and evaporator associated with these valves. In the intermediate and high range load conditions the valves 15 and 16 are maintained closed to fluid flow. The heat exchanger 17 provides additional heat transfer at heated fluid outlet temperatures below the heating fluid inlet temperature.

Heat exchanger 18 is used only in the parallel flow embodiment and is a liquid sub-cooler used to improve the coefficient of performance of the last stage of the parallel flow heat pump. This heat exchanger 18 is not used in the embodiment of FIG. 1 because the temperature lift is the same for all stages of a counter flow heat pump, and the piping complexity for applying it to three or more stages is not warranted. Both FIGS. 1 and 2 also show a heat exchanger by-pass switch 19 which may be selectively operated at high loads for by-passing the heat exchanger 17. The switch 19 operates when the entering heated fluid temperature into the heat exchanger exceeds the entering heating fluid temperature.

Figure 3:
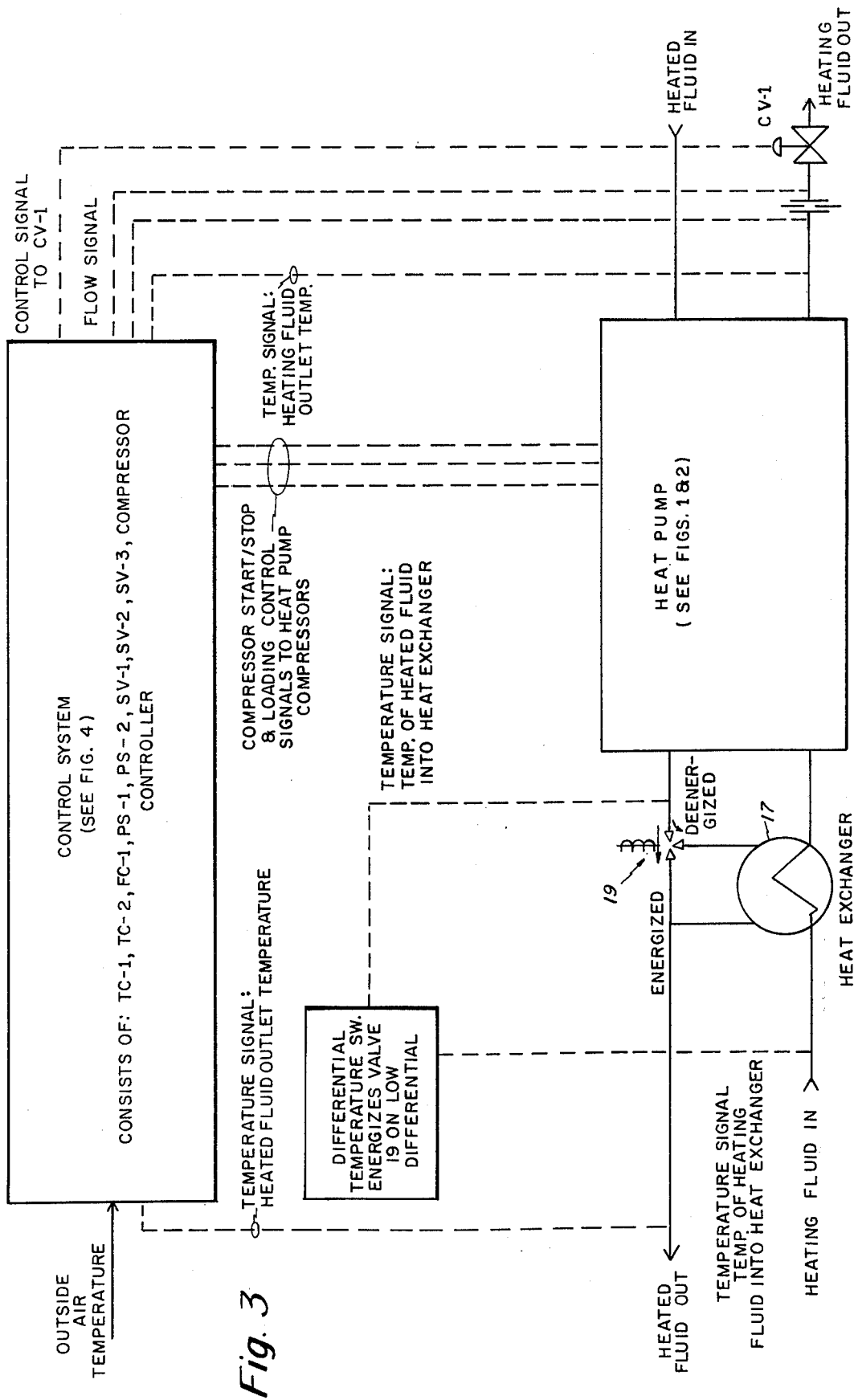
FIG. 3 is a schematic diagram of a total system of the invention including heat pump and controls.
Figure 4:
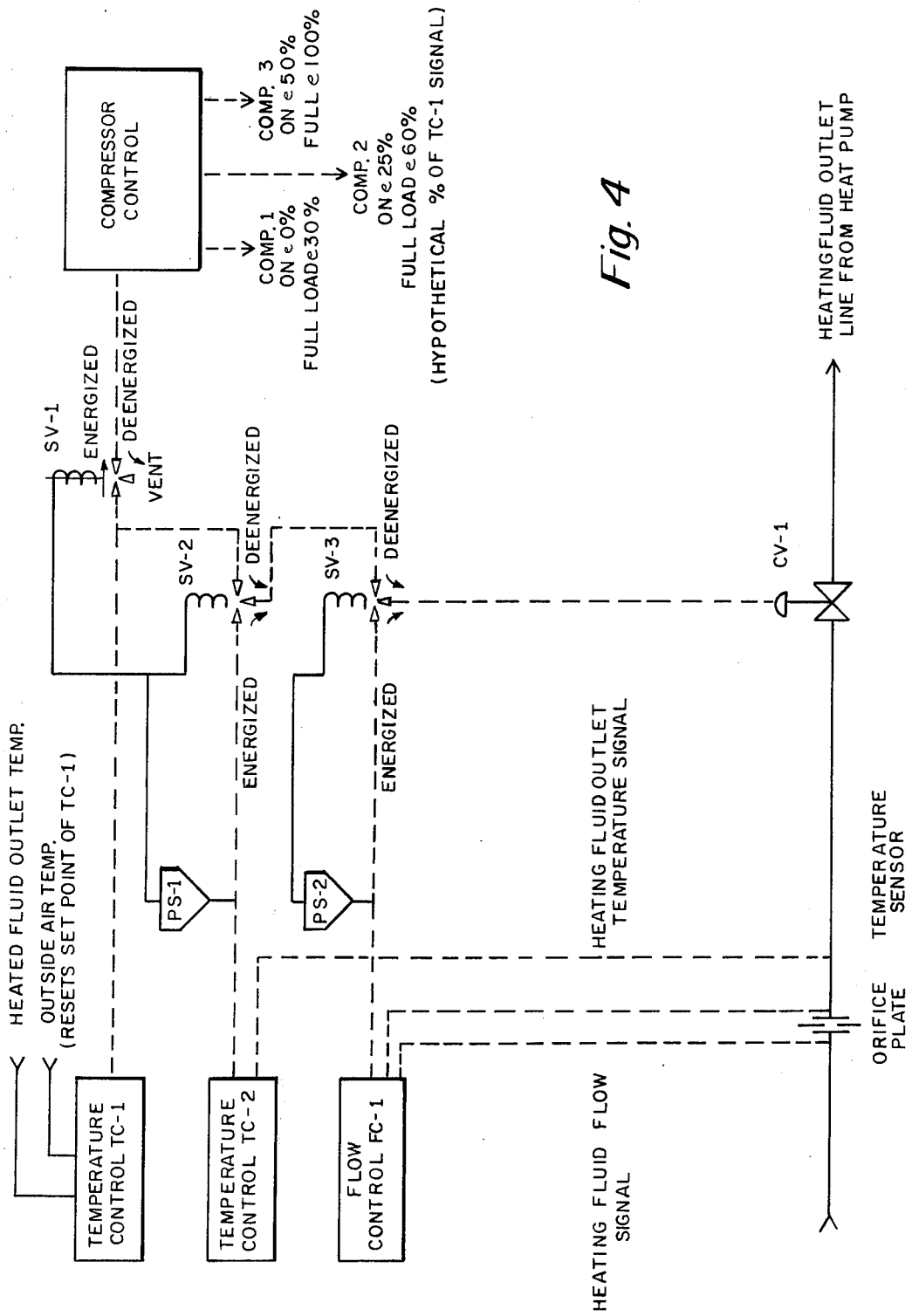
FIG. 4 shows the control system in a preferred implementation.

With reference now in particular to FIGS. 3 and 4, the outside air temperature is set to adjust the set point of temperature controller TC-1, which is a standard temperature controller with remote set point. The output of the controller TC-1 is proportional to the difference between the heated fluid temperature output from the heat pump/heat exchanger combination, and a set point as determined by outside air temperature. Decreasing outside air temperature increases the set point of controller TC-1. A component of output of the controller TC-1 proportional to the time integral of the difference between set point and heated fluid outlet temperature may be added to produce better control, in accordance with standard control practice.

Assuming that valves SV-1, SV-2 and SV-3 are all deenergized, the main control valve CV-1 is controlled from the temperature controlled TC-1. The main control valve CV-1 is a flow control valve of conventional construction disposed in the heating fluid line. Valves SV-1 and SV-2 are operated in tandem and these valves are in their deenergized state if the output pressure of temperature controller TC-2 is below the set point of pressure switch PS-1. The output of controller TC-2 is proportional to the difference between the set point of this controller and the temperature of the heating fluid leaving the heat pump. This temperature can be sensed by a conventional temperature sensor. By proper adjustment of controller TC-2 and pressure switch PS-1, the pressure switch will energize valves SV-1 and SV-2 at a preset heating fluid outlet temperature. Pressure switch PS-2 monitors the output signal of flow controller FC-1. The output of this controller is proportional to the difference between the preset flow set point and the actual heating fluid flow. By proper adjustment of controller FC-1 and pressure switch PS-2, the pressure switch will energize valve SV-3 at a preset flow value.

When all of the valves SV-1, SV-2 and SV-3 are deenergized, the heating system is in its passive mode of operation, or as referred to hereinbefore, the low regime. The controls on the heat pump are to be properly adjusted to also have the heat pump operate in the passive mode. This requires that valve 19 of the heat pump which is controlled by the temperature differential between the heated fluid into the heat exchanger and the heating fluid into the heat exchanger be set to pass fluid through the heat exchanger whenever the heating fluid entering the heat exchanger is warmer than the heated fluid entering the heat exchanger. The temperature of the heated fluid out of the heat pump is controlled by varying the heating fluid flow by means of a control valve CV-1.

Figure 5:
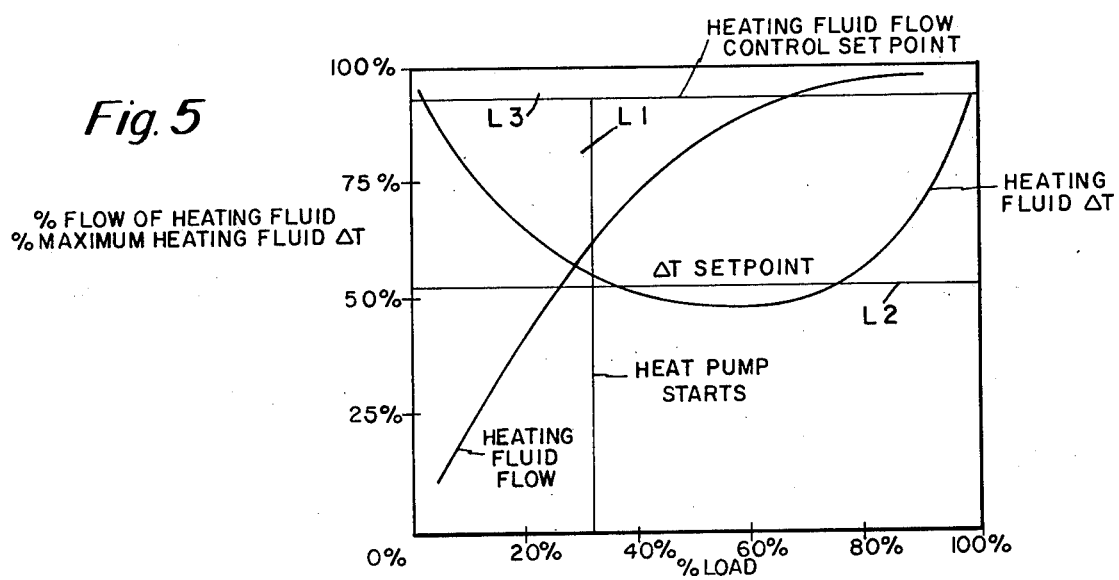
FIGS. 5 and 6 show graphs associated with the system of this invention.

FIG. 5 shows two curves; one of heating fluid $\Delta T$ as a function of load and the other one of heating fluid flow as a function of load. The graphs of FIG. 5 also show typical set points for controllers TC-2 and FC-1, which controllers are shown in FIG. 4.

With regard to the passive mode or the low load mode of operation and with reference to the diagram of FIG. 5, operation in this region takes place at low percentage loads to the left of the line L1 marked "heat pump starts".

With regard to FIG. 5, as the heating fluid $\Delta T$ drops on increasing load, the heating fluid outlet temperature will rise (outlet temperature = inlet temperature − $\Delta T$). As the outlet temperature rises, the output of controller TC-2 rises until it reaches the set point of pressure switch PS-1, will then energize valves SV-1 and SV-2. Valve SV-1 switches the output of controller TC-1 to the compressor controller and at the same time valve SV-2 takes over control of the main control valve CV-1 transferring control from controller TC-1 to controller TC-2. The flow of heating fluid is then controlled by the controller TC-2 in such a manner that outlet temperature and $\Delta T$ are maintained constant. This is the region in FIG. 5 where the heating fluid $\Delta T$ curve is in the vicinity of the horizontal line L2 marked "$\Delta T$ set point".

When the output from the temperature controller TC-1 is transferred to the compressors, each compressor, see FIGS. 1 and 2, is started and loaded by a relay responsive to a portion of the output range of controller TC-1. The first compressor is started immediately upon receipt of a signal from controller TC-1 by way of valve SV-1. The loading of the first compressor will be proportional to the signal from controller TC-1 except that maximum load will occur at less than full output from the controller. FIG. 4 shows the range for the first compressor between loads of 0% and 30%. The second compressor is started as soon as the output of the controller TC-1 reaches a predetermined set point. FIG. 4 shows the range for the second compressor between 25% and 60%. The third compressor also has a predetermined set point of operation between 50% and 100%. It is noted that there is an overlap in the operation of these compressors so that during active operation at least one compressor is always operating.

As the load increases, the flow of heating fluid increases and once the load has increased to the set point of pressure switch PS-2, it will switch and cause control to pass flow controller FC-1. The controller FC-1 acts to limit the flow to a preset maximum. With regard to FIG. 5 control in this area is shown by the horizontal line L3 marked "heating fluid flow control set point". The heat pump compressors are still controlled in response to the output of controller TC-1 so that if this controller calls for still more heat, the heat pump extracts more heat from the heating fluid, thereby raising $\Delta T$.

It is important to note that heated fluid outlet temperature is maintained at a level determined by some external variable (such as outside air temperature) which is proportional to the heat output required of the heating system. Thus, as outdoor air temperature drops, more heat is needed from the heating system, which must be supplied with hotter fluid in order to produce more heat. At constant heated fluid mass flow rate, the load is proportional to the difference between heated fluid temperature out of the heat pump and heated fluid temperature returned to the heat pump. However, this load will be determined by a number of variables including outside air temperature, room thermostat setting, wind speed, etc.

The internal controls for the heat pump which cause the heat pump to switch modes of operation are preferably not responsive to external variables such as outside air temperature but are responsive to variables which relate to the performance of the heat pump, namely heating fluid flow and heating fluid temperature. The boundaries between the three regions of control action are determined by preset values of heating fluid flow and heating fluid temperature.

Of the two control schemes; that is, the control for the heat pump and the control for the system are preferably separate and distinct. The heated fluid outlet temperature is regulated in response to outside temperature, so that the heated fluid will have a high enough temperature to transfer sufficient heat to meet the anticipated load. The internal control system optimizes the way in which the system produces that stream of heated fluid at that temperature. This action is summarized in table I.

The control operation previously discussed is a proportional control scheme employing amplitude modulation. This type of control is expensive especially for small application such as residential heat pumps. Thus, it is feasible to approximate the effect of the proportional control scheme by the use of on-off controls. In this case, the thermostat in the heated space serves to open the heating fluid valve and turn on the heat pump.

In one arrangement with on-off control, the room thermostat or other final control element controls the on-off operation of the heat pump directly, and also the on-off operation of the heating fluid valve. Whenever heat is demanded, the valve opens and the full flow of heating fluid is directed to the heat pump. When the load is light enough to permit heat transfer to take place without operation of the heat pump, the heat pump operation is suppressed by sensors responsive to some load determining variable, such as outside temperature. The various heat pump stages are then started in sequence, in order to maintain balance between the load and the capacity of the system.

Figure 6:
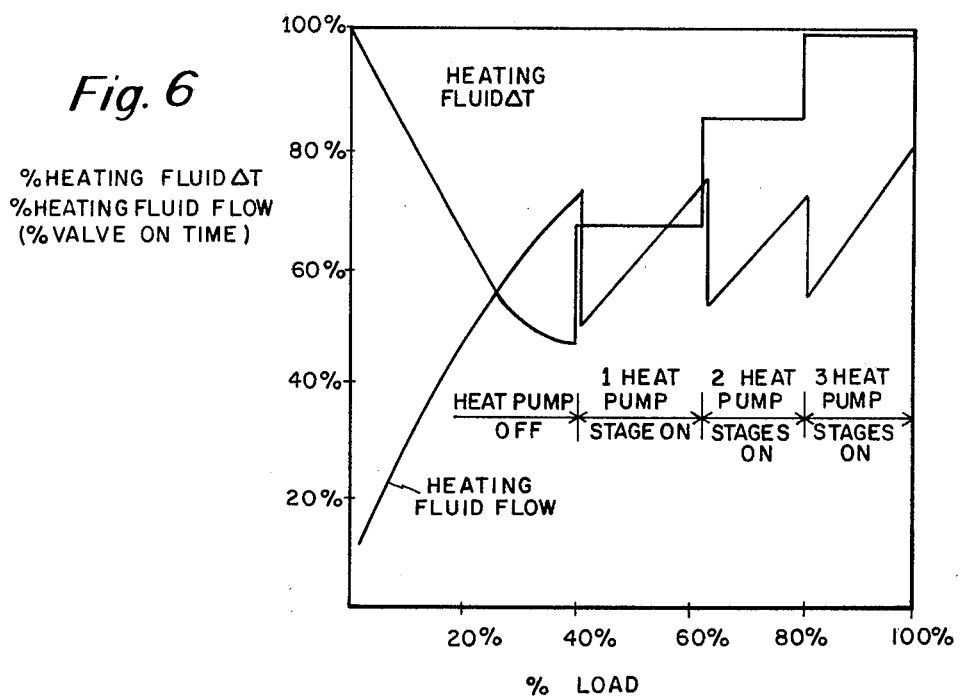

The operation of the heat pump is shown graphically in FIG. 6. The average flow is modulated by varying the percent "on" time. As more heat pump stages are operated, the heat extracted from the heating fluid increases. In order for an on-off control to be successful, the system "on" time is less than 100%, even at full load. However, the output of the system is increased at high loads by increasing the number of heat pump stages operating.

A control system of this invention maintains heating fluid temperature at a fixed value. This presupposes constant heating fluid inlet temperature. Heating fluid outlet temperature is used because the control apparatus is simpler. However, if heating fluid inlet temperature is subject to appreciable variation, then temperature differential between inlet and outlet should be variable controlled instead.

Figure 7A:
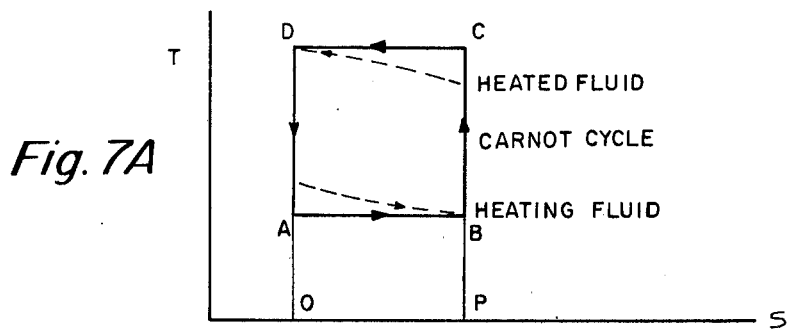
FIG. 7 shows temperature entropy diagrams of the system of this invention.

FIG. 7A shows a Carnot cycle heat pump, the area defined by the rectangle ABCD. The area inside a closed curve on a temperature-enthropy diagram is equal to the work of the cycle. The heat produced by a heat pump is equal to the area between the top line on the T-S diagram, and the S axis. In the case of the Carnot cycle shown, the work input is equal to the area ABCD. The heat delivered to the load is equal to the area between line CD and the S axis.

A single stage heat pump must operate between the lowest heating temperature fluid and the highest heated fluid temperature. The paths traced by the heated fluid and a heating fluid on the T-S diagram are shown in FIG. 7A by the dotted lines. Note that the heating fluid temperature is consistently above the minimum cycle temperature and that the heated fluid temperature is consistently below the maximum cycle temperature. This difference in temperature between the heated fluid temperature and the maximum cycle temperature represents a loss in efficiency.

Figure 7B:
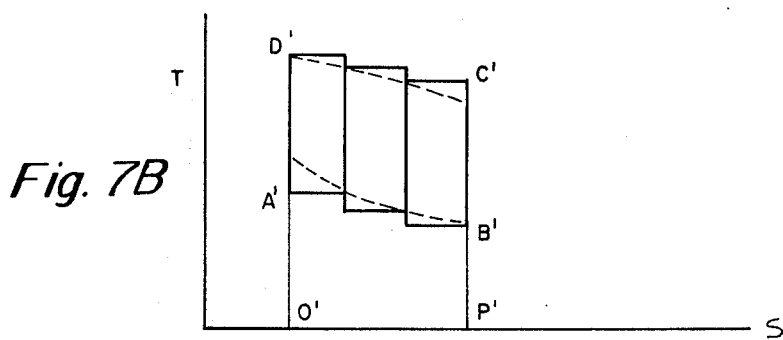
Figure 7C:
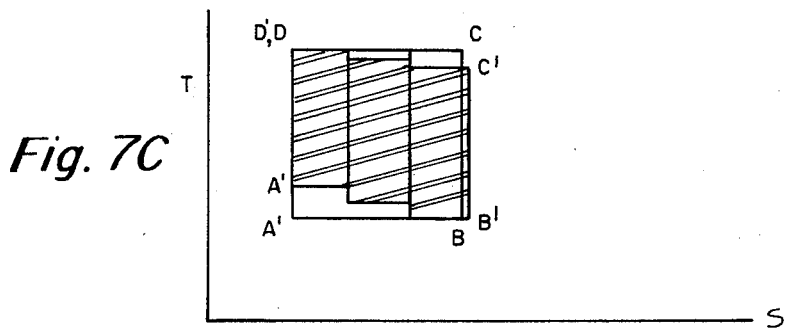

FIG. 7B shows a three stage heat pump approximation to the actual paths traced out by the heated fluid and the heating fluid. The distance between C' and D' has been adjusted to make the area O', D', C', P' equal to the area ODCP which means that the output of both heat pumps is the same. That the work required by the multi-stage heat pump is less than the single stage heat pump can be seen by examination of FIG. 7C. It is clear that the area A', B', C', D' is less than the area ABCD.

In the low load mode of operation, two modes of heat transfer are used: heat transfer directly between the heating fluid and heated fluid in heat exchanger 17, and heat transfer between the heating fluid and heat pump refrigerant in evaporator 11, followed by heat transfer between the refrigerant and the heated fluid in condenser 13. Heat exchanger 17 is a conventional type heat exchanger, of any particular design suited for the purpose, and follows the standard methods of analysis for heat transfer in heat exchangers. Evaporator 11, and condenser 13 are conventional heat pump components. During heat pump operation, they are connected by compressor 12, and expansion valve 14. However, in the low load mode of operation, valves 15 and 16 are opened, permitting free passage of refrigerant liquid and vapor between the evaporator and condenser. Under these conditions, the evaporator pressure is equal to the condenser pressure, and the two behave as one heat exchanger with non-standard characteristics. The heating fluid transfers heat to the refrigerant in evaporator 11, thus vaporizing the refrigerant. The refrigerant vapor passes through valve 16 to condenser 13, where the vapor condenses, and gives up its heat to the heated fluid. The liquid refrigerant returns to the condenser via valve 15, and begins the cycle all over again.

In the low load mode of operation, the warm heating fluid passes first through the heat exchanger 17, and then flows in series through the refrigerant evaporators 11. After it has passed through the last evaporator, it leaves the system. Not all of the evaporators need be used for passive heat transfer. For example, in FIG. 2, a system is illustrated which used only one of the evaporators this way. The heating fluid gives up some of its heat in the heat exchanger 17, and the remainder in the evaporators. The heated fluid flow path depends on the particular configuration of the system. Two configurations are shown in in FIGS. 1 and 2. In both cases, in the low load mode, the heated fluid flows through both the refrigerant evaporators and the heat exchanger.

As the load increases, the temperature of the heated fluid entering the condenser of any given heat pump stage will approach the temperature of the heating fluid entering the evaporator of that heat pump stage. As the temperature difference between the two entering fluid streams decreases, less heat transfer will be possible between the two streams. At some point, as the temperature differential is decreasing, a temperature sensor will close valves 15 and 16, thus permitting normal heat pump action to take place, as required by the control system. The control of valves 15 and 16 is completely local, and depends only on the temperature differential between the heating fluid entering the evaporator, and heated fluid entering the condenser.

As the heating fluid outlet temperature increases with increasing load, temperature controller TC-1 will activate the heat pump compressor control, which will start loading the heat pump stages, one at a time. The control for valve 19 (heat exchanger bypass) also operates independently for the heated fluid outlet temperature control system. Valve 19 will permit flow through the heat exchanger as long as there is sufficient temperature difference between the heating fluid inlet and heated fluid inlet to permit heat transfer.

In summary, the heating system operates in a purely passive mode, as long as there was sufficient temperature differential to drive the heat transfer process. During passive operation, control of heated fluid outlet temperature would be by means of varying heating fluid flow. As the load increased, the temperature differential would become insufficient to drive the heat transfer process. The control system would sense this as increased heating fluid outlet temperature. At a preset point, the control system would switch out of the purely passive mode, and would begin activating the heat pump stage by stage to meet the load. However, some passive heat transfer might continue to take place in exchanger 17 at loads slightly above the switch-over point.

As the load increased further, passive heat transfer would be eliminated entirely, with all heat transfer taking place in the various heat pump stages. At the very highest loads, the heating fluid flow would be limited by flow control FC-1 forcing the heat pumps to cool the heating fluid through a higher temperature difference.

In the high load mode, the heating fluid flows through the heat exchanger and then flows through all the evaporators in series. Although the heating fluid flows through the heat exchanger, it does not give off any heat, once valve 19 is closed.

The heated fluid flow is dependent upon the particular system configuration, but will be through the refrigerant condensers, and through the refrigerant subcoolers (if used). Once valve 19 is closed, the heated fluid does not flow through the heat exchanger.

Having described a limited number of embodiments of the present invention it should now become apparent to those skilled in the art that there are numerous other embodiments that all within the scope of this invention. For example, a single main control valve has been shown operated from a number of controllers. In an alternate embodiment of the invention each controller may have a control valve associated therewith with all control valves being coupled in series in the heating fluid line. In FIGS. 3 and 4 the control system has been based upon pneumatic controls. It is understood that electronic controls can be equally applicable.

What is claimed is:

1. A heating system for receiving a heating fluid and providing heat transfer to a heated fluid, comprising;
    at least one heat pump stage receiving said heating fluid and said heated fluid and comprising heat transfer means including compressor means and means for controlling the compressor means,
    heat exchanger means coupled to said heat pump receiving said heating fluid and said heated fluid,
    means defining a first load range including means for inhibiting operation of said compressor means but permitting refrigerant flow in said heat transfer means,
    and means defining a second load range including means for operating said compressor means.

2. A heating system as set forth in claim 1 including a plurality of heat pump stages connected in parallel flow arrangement.

3. A heating system as set forth in claim 1 including a plurality of heat pump stages connected in counterflow arrangement.

4. A heating system as set forth in claim 1 including control means for by-passing said heat exchanger means when the heated fluid is warmer than the heating fluid.

5. A heating system as set forth in claim 1 wherein said means defining a first load range includes outside air temperature sensor means.

6. A heating system as set forth in claim 5 including a first temperature controller responsive to heated fluid outlet temperature and outside air temperature and a second temperature controller responsive to heating fluid temperature for respectively defining the first and second load ranges.

7. A heating system as set forth in claim 1 including bypass means across said compresssor means operable during the load period.

8. Apparatus for controlling a heating system which receives heating fluid and provides heat transfer to a heated fluid, comprising;
    heat pump means receiving said heating fluid and said heated fluid,
    means defining a heating fluid line, coupling to the heat pump means,
    flow control means in said heating fluid line,
    first means responsive to heated fluid outlet temperature for controlling said flow control means,
    and second means responsive to heating fluid outlet temperature for controlling said flow control means.

9. Apparatus as set forth in claim 8 including third means responsive to heating fluid mass flow for controlling said flow control means.

10. Apparatus as set forth in claim 8 wherein said heat pump means has multiple stages each including compressor means and means for selectively operating the compressor means.

11. Apparatus as set forth in claim 8 including heat exchanger means coupled to said heat pump means and receiving said heating fluid and said heated fluid.

* * * * *